United States Patent
Andreasch (10) Patent No.: US 11,752,572 B2
(45) Date of Patent: Sep. 12, 2023

(54) METHOD AND LASER PROCESSING MACHINING FOR LASER WELDING A FIRST AND A SECOND WORKPIECE PORTION

(71) Applicant: TRUMPF Werkzeugmaschinen GmbH + Co. KG, Ditzingen (DE)

(72) Inventor: Wolfgang Andreasch, Weinstadt (DE)

(73) Assignee: TRUMPF Werkzeugmaschinen SE + Co. KG, Ditzingen (DE)

( * ) Notice: Subject to any disclaimer, the term of this patent is extended or adjusted under 35 U.S.C. 154(b) by 796 days.

(21) Appl. No.: 16/335,937

(22) PCT Filed: Sep. 7, 2017

(86) PCT No.: PCT/EP2017/072472
§ 371 (c)(1),
(2) Date: Mar. 22, 2019

(87) PCT Pub. No.: WO2018/059901
PCT Pub. Date: Apr. 5, 2018

(65) Prior Publication Data
US 2020/0030909 A1    Jan. 30, 2020

(30) Foreign Application Priority Data

Sep. 27, 2016 (DE) .................... 10 2016 118 189.7

(51) Int. Cl.
*B23K 26/064* (2014.01)
*B23K 26/32* (2014.01)
(Continued)

(52) U.S. Cl.
CPC ............ *B23K 26/064* (2015.10); *B23K 26/03* (2013.01); *B23K 26/044* (2015.10);
(Continued)

(58) Field of Classification Search
None
See application file for complete search history.

(56) References Cited

U.S. PATENT DOCUMENTS 4,376,886 A * 3/1983 Sciaky ............... B23K 15/0053
219/121.28
6,023,044 A * 2/2000 Kosaka .................. B23K 9/025
901/42
(Continued)

FOREIGN PATENT DOCUMENTS

DE      44 01 597 A1    8/1994
DE      197 24 986 C2   7/1998
(Continued)

OTHER PUBLICATIONS

International Preliminary Report on Patentability in International Application No. PCT/EP2017/072472, dated Apr. 2, 2019, 10 pages (English translation).

(Continued)

*Primary Examiner* — Justin C Dodson
(74) *Attorney, Agent, or Firm* — Fish & Richardson P.C.

(57) ABSTRACT

The invention relates to methods for laser welding a first and a second workpiece portion with a laser beam that is guided using a laser machining head along a joining gap formed between the workpiece portions, in which method the laser beam is focused and a filler is lined up with the joining gap. At least one gap width of the joining gap of the workpiece portions to be welded is detected and evaluated along the course of the joining gap and compared with at least a first and a second gap measurement. If a detected gap width is within the first gap measurement, the feeding of the filler to the joining gap is stopped and a beam profile of the laser beam is set with a point or annular focus, and if a detected gap width is within the second gap measurement, a feeding of the filler is actuated.

12 Claims, 8 Drawing Sheets

(51) Int. Cl.
    *B23K 26/03*         (2006.01)
    *B23K 26/08*         (2014.01)
    *B23K 26/211*       (2014.01)
    *B23K 26/26*         (2014.01)
    *B23K 26/70*         (2014.01)
    *B23K 26/073*       (2006.01)
    *B23K 26/044*       (2014.01)

(52) U.S. Cl.
    CPC ...... *B23K 26/0734* (2013.01); *B23K 26/0869* (2013.01); *B23K 26/211* (2015.10); *B23K 26/26* (2013.01); *B23K 26/32* (2013.01); *B23K 26/706* (2015.10)

(56) References Cited

U.S. PATENT DOCUMENTS

| | | | | |
|---|---|---|---|---|
| 2005/0077276 A1* | 4/2005 | Chen | ............ | B29C 66/242 |
| | | | | 219/121.73 |
| 2006/0065640 A1* | 3/2006 | Lizotte | ............ | B23K 26/389 |
| | | | | 219/121.61 |
| 2010/0206857 A1* | 8/2010 | Bea | ............ | B23K 26/0734 |
| | | | | 219/121.64 |
| 2013/0319980 A1* | 12/2013 | Hesse | ............ | B23K 26/032 |
| | | | | 219/121.62 |
| 2014/0268368 A1* | 9/2014 | Chan | ............ | B23K 26/073 |
| | | | | 359/717 |
| 2015/0306702 A1* | 10/2015 | Breuer | ............ | C22C 38/06 |
| | | | | 219/121.64 |
| 2016/0067808 A1* | 3/2016 | Peters | ............ | B23K 9/0216 |
| | | | | 219/137 R |
| 2016/0114428 A1* | 4/2016 | Wang | ............ | B23K 26/32 |
| | | | | 219/121.64 |
| 2016/0207142 A1* | 7/2016 | Kawamoto | ............ | B23K 26/26 |
| 2016/0288257 A1* | 10/2016 | Deiss | ............ | B23K 26/38 |
| 2016/0346875 A1* | 12/2016 | Bruck | ............ | B23K 26/34 |
| 2017/0259373 A1* | 9/2017 | Albert | ............ | B23K 31/125 |

FOREIGN PATENT DOCUMENTS

| | | |
|---|---|---|
| DE | 197 24 986 A1 | 12/1998 |
| DE | 10 2007 018400 | 10/2008 |
| DE | 10 2010 003750 A1 | 10/2011 |
| DE | 10 2010 018687 A1 | 10/2011 |
| DE | 10 2015 003591 A1 | 9/2015 |
| DE | 10 2014 108426 | 12/2015 |
| DE | 10 2013 008 085 B4 | 2/2017 |
| JP | 2015-178118 * | 10/2015 |

OTHER PUBLICATIONS

International Search Report and Written Opinion in International Application No. PCT/EP2017/072472, 22 pages (with English translation).

* cited by examiner

METHOD AND LASER PROCESSING MACHINING FOR LASER WELDING A FIRST AND A SECOND WORKPIECE PORTION

CROSS REFERENCE TO RELATED APPLICATIONS

This application is a continuation of and claims priority under 35 U.S.C. § 120 from PCT Application No. PCT/EP2017/072472 filed on Sep. 7, 2017, which claims priority from German Application No. DE 10 2016 118 189.7, filed on Sep. 27, 2016. The entire contents of each of these priority applications are incorporated herein by reference.

TECHNICAL FIELD

The invention relates to a method for laser welding a first and a second workpiece portion with a laser beam, and a laser processing machine for carrying out the method.

BACKGROUND

A laser processing machine is known from JP 09-108 869 A1, in which a freely rotatable laser processing head is provided, which directs a laser beam onto a joining gap between the workpiece portions to be welded. A supply device for an additional wire or welding wire emerges on a housing of the laser processing head with a focusing optical system, said supply device being arranged on the laser processing head freely rotatably about the laser processing head. During the laser welding, the supply device is rotatably driven in relation to the laser processing head in such a way that the supply of the additional wire is set up in advance of the laser beam.

A device for laser welding is proposed by FR 2 823 688 A1. A laser beam is expanded to a ring via a focusing optical system and then focused to a point via a lens, which occurs in the joining gap. Inside the focusing laser beam, a supply device in the form of a nozzle is provided in order to supply weldable material to the joining gap perpendicularly to the workpiece plane.

A positioning device for receiving a laser processing head and a supply device for a welding wire are known from DE 94 01 081 U1. This positioning device receives a laser processing head at an angle of 45° in relation to the surface of the workpiece portions to be welded. The supply device is provided between the laser processing head and the surface of the workpiece portions to be processed in order to generate a welded seam in the joining gap of the workpiece portions to be welded.

A method and a device for joining workpieces with a processing beam are known from DE 10 2013 008 085 B4, in which the processing beam is guided along a joining splice between the workpieces to be joined with a processing head by supplying an additional substance. During the joining, a current relative speed between the processing head and the workpiece is determined. An output of the processing beam is controlled depending on the current relative speed. The supply amount of the additional substance per time unit is regulated depending on the current relative speed and a current seam width of the connection seam.

A laser processing device having a beam mode control is known from DE 44 01 597 A1. An optimally adjusted laser beam mode is set for processing the workpiece on the basis of a change of the focusing properties of each mode and of the movement amount of the focal point of the beam in relation to a change of a laser output value.

A method for welding workpieces and a device for carrying out the method are known from DE 197 24 986 C2. In a preliminary test, a limit value of a radiation signal is determined, which, with a gap width of zero, may not be exceeded or fallen below for maintaining a welding with a predetermined minimum quality. In the actual welding process, the width of the gap in the welding point is determined and the current limit value of the maximum and minimum width of the gap is compared on the basis of a correction relationship in comparison to the limit values determined in the preliminary tests, wherein the current limit values are shifted by an amount corresponding to the current gap width in the welding point.

A method for changing a beam profile characteristic of a laser beam is known from DE 10 2010 003 750 A1. To change the beam profile characteristic of an uncoupled laser beam, a multi-clad fibre is used. Depending on the coupling of the laser beam, a full circular profile can be controlled, which is used, for example, for a laser cutting process. Furthermore, a ring profile can be generated, which is used, for example, for a laser welding process. Moreover, a wide full beam profile can be obtained, which can also be used for the laser welding.

SUMMARY

The object of the invention is to propose a method and a laser processing machine for laser welding a first and a second workpiece portion by means of a laser beam, by means of which a further improvement in the quality of the welded seam to be generated is made possible depending on the parameters for welding the first and second workpiece portion.

This object is solved by a method for laser welding a first and second workpiece portion by means of a laser beam, in which at least one gap width of a joining gap formed between the first and second workpiece portion is ascertained, the gap width is evaluated along the course of the joining gap and compared with at least one first and one second gap size, wherein the first gap size comprises a gap width, with which a welded seam is formed without additional substances, and the second gap size comprises a gap width, with which an additional substance is supplied for forming the welded seam to fill the joining gap and with an ascertained gap width, which is within the first gap size, the supply of the additional substance to the joining gap stops during the laser welding and a beam profile of the laser beam is set with a point or ring focus or, with an ascertained gap width, which is inside the second gap size, a supply of the additional substance to the joining gap is controlled and a beam profile of the laser beam is set with a ring focus. As a result, depending on the gap width of the joining gap, in particular along the course of the joining gap, an optimisation of the laser welding is made possible by switching on or switching off the additional substance, on one hand, and a corresponding adaptation of the beam profile of the laser beam, on the other hand, being controlled. Thus, this method enables a tolerant laser welding, which means that a consistent welding quality can be obtained along a joining gap, even with deviating ratios.

According to a preferred embodiment of the method, the joining gap is detected by an optical device, wherein the detection of the gap width and/or its course is preferably carried out during a teach-in mode. As a result, a process time optimisation is made possible. Alternatively, the joining gap can be detected immediately before introducing the welded seam by means of a sensor system, wherein this sensor system is preferably integrated in the optical system in the laser processing head, which detects the joining gap in advance coaxially or off-axis relative to the laser beam. The actual detected geometric ratios of the joining gap are detected by the optical device or the sensor system and are forwarded on to the control device, by means of which a corresponding control for supplying or switching off the additional substance and for forming the beam profile of the laser beam is carried out depending on a comparison of the deposited parameter for the selection of the first and second gap size.

Preferably, the welding parameters for the first gap size of at least the workpiece portions to be welded are selected based on a material thickness. A selection criterion for this can be the material thickness of the workpieces to be welded, which is smaller than the gap size. Along with the material thickness, joining geometries and/or the material of the workpieces to be welded can also be included in the selection.

Preferably, the first joining size is selected at least based on a material thickness of the workpiece portions to be welded when the first gap size is equal to or less than a share of 15% of the material thickness of the workpiece portion to be welded, particularly preferably equal to or less than a share of 10% of the material thickness workpiece portion to be welded. This can apply, in particular, to workpieces having a material thickness of 3 mm or less. In such cases, the laser welding without supplying the additional substance is particularly suitable. Depending on the actual width of the joining gap, a punctiform or annular focus for the beam profile of the laser beam can also be selected and controlled.

Furthermore, the second gap size is preferably greater than the first gap size and comprises all widths of the joining gap which lie outside the first gap size. As a result, a simple differentiation between the first and second gap size and the corresponding adjustment parameters for the laser welding can be made possible.

A preferred embodiment of the method provides that the additional substance is supplied to the joining gap in advance in the welding direction in relation to the beam axis of the laser beam. This has the advantage that the welding point, or the molten bath, is still passed over completely by the laser beam after the melting of the additional substance and, here, heat is also applied, whereby the quality of the welded seam is improved. The additional heat application is thus directed extensively in the welded seam direction, which is why hardly any or, in the best case, no additional construction delay emerges.

According to a first embodiment of the method, the additional substance can be an additional wire, which is supplied via a wire supply device. The material and/or the thickness of the wire is adjusted to the further parameters, which emerge from the workpiece portions to be welded, such as, for example, the substance, the thickness of the workpiece portions and/or the joining geometry. Alternatively, a powder can be used as an additional workpiece, which is supplied via a nozzle. This one nozzle or several nozzles can be arranged next to the laser beam or coaxially to the laser beam. Alternatively, a coaxial ring gap nozzle can also be used.

Furthermore, an annular beam surface is preferably formed by the beam profile of the laser beam with a ring focus, said annular surface covering the joining gap, wherein an inner beam-free region is delimited by an inner beam surface edge, said region preferably substantially corresponding to the width of the joining gap or being wider, and an outer beam surface edge of the annular beam surface covers both edges of the workpiece portion to be welded. On one hand, such an adaptation enables a safe melting of the additional substance in the joining gap, as well as a melting of the joining geometry of the workpiece portions in order to obtain a welding connection with a high quality.

Preferably, the additional substance is supplied in a beam surface portion of the annular beam profile of the laser beam, which is formed by a region of the annular beam surface which is in front in the advance direction and covers the joining gap. This has the advantage that the additional substance can be melted quickly and inserted deeper into the joining gap, and the edge regions are increasingly warmed away from the joining gap. As a result, a homogeneous structure is formed in the welded seam.

Preferably, the molten mass or molten bath formed in advance of the surface portion is reheated in a beam surface portion of the ring focus that comes after and covers the joining gap. As a result, the temperature gradient can be reduced in comparison to the surrounding material, whereby the cooling speed decreases. This can have a positive influence on the emergence of hot tears.

A further advantageous embodiment of the method provides that the width of the beam portion of the laser beam, said beam portion covering the joining gap, having the annular beam profile is set by a distance apart of the beam focus above or below the plane of the workpiece portions to be connected. As a result, the width of the beam surface portion can be set in a simple manner, which occurs on the joining gap and adjacent joining gap.

Alternatively, the beam profile is formed by a 2-in-1 fibre, a 3-in-1 fibre, an n-in 1 fibre or an axicon. These embodiments have the advantage that no additional moved parts are required in the processing head and, in addition, very high laser intensities are made possible.

A further preferred embodiment of the method provides that the additional substance is supplied to the joining gap with a supply device, and the supply device is aligned in a supply axis in relation to the joining gap, preferably perpendicular thereto, and the laser beam is coupled into a movement device arranged in the housing by the housing and transferred into a beam axis of the movement device, wherein the beam axis of the movement device is rotatably driven around the supply axis in the welding direction corresponding to the course of the joining gap, and the beam axis crosses the supply substance in the joining gap during the rotational movement. This has the advantage that a processing of joining gaps which do not only exclusively have a straight course is required in a simple manner. Any line guides of the joining gap can be processed with a preferably continuous shifting movement of the laser processing head.

The object underlying the invention is furthermore solved by a laser processing machine having a laser source and a beam guide, with which a laser beam is directed onto a joining gap by means of a laser processing head, and a supply device is provided, which lies on a supply axis and supplies the additional substance in the supply axis to the joining gap, and a movement device is provided on the housing, by means of which movement device the laser beam guided in the housing along a main axis is deflected above the joining gap and is transferred into a beam axis in the movement device, which is aligned at an angle in relation to the supply axis or main axis and crosses the joining gap, and the movement device is provided rotatably on the housing around the supply axis or main axis. As a result, a supply axis fixed on the laser processing head is formed, which improves the supply accuracy of the additional substance. Moreover, an exact adjustment to the actual course of the joining gap is made possible by the alignment of the beam axis independent of the linear movement or shifting movement of the processing head in order to form the welded seam. The beam axis is directed towards the course of the joining gap.

Preferably, the supply axis lies on the main axis. As a result, the construction of the laser processing head is simplified. Alternatively, this can also be aligned in parallel to the main axis.

Preferably, the main axis of the collimation optical system of the laser beam is aligned perpendicular to the joining gap. As a result, simple geometric ratios can furthermore be created in the construction of the laser processing head and also in the control by means of a single or multi-axis linear axis system.

A preferred embodiment of the laser processing machine provides that the beam axis of the movement device is mounted at an angle of at least ±90°, in particular at least 135°, rotatably around the main axis on the housing.

The movement device of the laser processing machine preferably has at least one deflecting mirror, a processing optical system formed, in particular, as a focusing lens, and, preferably, a protective glass arranged on the beam output side. As a result, a decoupling of the laser beam from the main axis and a transfer into the beam axis that can be aligned in relation to the joining gap can take place in a simple manner. Preferably, this movement device is arranged on a housing of the laser processing head, said housing comprising the collimation optical system, by means of a rotational bracket.

A further preferred embodiment of the laser processing machine provides that the supply device has a holder arranged fixedly on the housing of the laser processing head in the main axis in relation to the fixed receiver of the supply nozzle. The movement device is preferably rotatable around this main axis. As a result, there are defined ratios, which are made possible as part of a precise welded seam formation. Alternatively, the holder can also be provided on the movement device, which is rotatable around the main axis on the housing.

Moreover, a conveying device for the supply substance is preferably provided on the housing. In the case of the formation of a wire as the additional substance, a wire supply nozzle is provided, through which the additional wire is centrally guided, which is controlled by means of the wire conveying device formed as a wire conveyor and is preferably supplied in a controlled manner via the control device. Alternatively, a powder can also be supplied as the additional substance. The supply nozzle preferably lies on the main axis.

A further embodiment of the laser processing machine provides a line laser on the holder of the supply device, the laser beam of said line laser preferably being directed towards the joining gap. This additional line laser can be used together with a suitable sensor for the laser line triangulation. With this, distance information, in particular, as well as gap position and gap width, can be determined.

A further advantageous embodiment of the laser processing machine provides a linear nozzle on the movement device that can preferably be adjusted in terms of height for supplying protective gas. This linear nozzle is advantageously provided behind the supply device, whereby a better coverage of the cooling molten mass is obtained, and there is less oxidation on the seam upper bead, whereby an improved welded seam quality can be obtained.

In order to generate the annular or punctiform beam profile of the laser beam, a 2-in-1 fibre, a 3-in-1 fibre or an axicon or an N-in-1 fibre can be provided with several coaxial ring fibres. An advantage of the fibre used is that the space requirement of the optical system is smaller as a result of the lack of additional optomechanical components, as would be required with the axicon, and there is no additional disruptive contour.

The invention and further advantageous embodiments and developments thereof are described and explained in more detail below by means of the examples depicted in the drawings. The features that can be seen in the description and the drawings can be applied individually or in several random combinations according to the invention. Here are shown:

DESCRIPTION OF DRAWINGS

FIG. 3 a schematic depiction of a laser beam coupled into a 2-in-1 fibre to generate a point focus, FIG. 4 a schematic depiction of a laser beam coupled into a 2-in-1 fibre to generate a ring focus, FIG. 5 a schematic sectional view of a laser processing head of the laser processing machine in FIG. 2, FIG. 6 a schematic sectional view of an alternative embodiment of the laser processing head of FIG. 5, FIG. 7 a schematic sectional view of an alternative embodiment of the laser processing head of FIG. 6, FIG. 8 a schematic side view of a welding process for forming a welded seam between two workpiece portions, FIG. 9 a schematic view from above of the method step according to FIG. 8, FIGS. 10 and 11 schematic side views of alternative embodiments of the method of FIG. 8, FIG. 12 a schematic view from above of a curved course of a joining gap, in which several welding positions are depicted, and FIG. 13 a schematic view of a refractive index course with an N-in-1 fibre.

DETAILED DESCRIPTION

Figure 1:
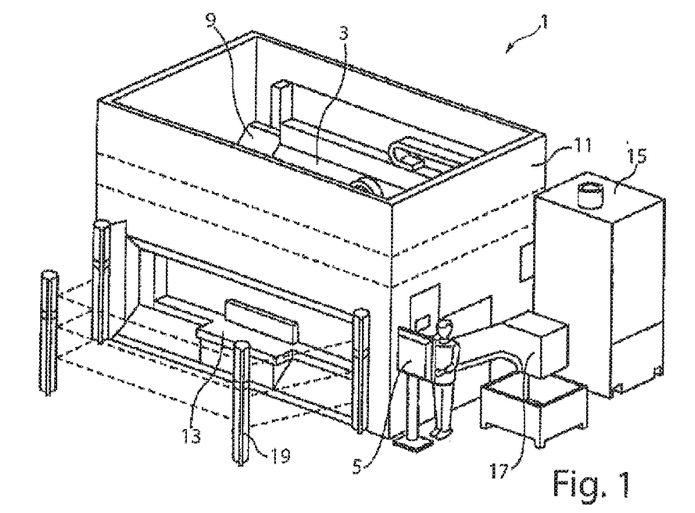
FIG. 1 a perspective view of a tool machine.

In FIG. 1, a tool machine 1 having a laser processing system 3 as the base machine for the processing of a workpiece is depicted. The operating of the tool machine 1 takes place via an operating console 5, for example via the preparation and setting of NC programmes which set working durations specifically to workpieces and their processing. A switch cabinet not depicted that is arranged, for example, on the rear side of the tool machine 1 has the corresponding machine control system as part of a tool machine control system, an electrical supply of drives, and logic and power parts.

A laser device of the laser processing system 3, said laser device not being explicitly shown in FIG. 1, serves for the generation of laser beam and can be based, for example, on a solid body laser such as a pane laser or fibre laser or a gas laser, such as a CO2 laser. The beam guide from the laser device to the workpiece can take place via the laser light cable and/or mirror. A cooling aggregate 9 for the laser device ensures the cooling of optical components such as deflection or collimation mirrors and of the switch cabinet. A protective cabin 11 serves to shield the laser beam from the outside. In FIG. 1, the roof cladding of the protective cabin 11 is not depicted for inspection.

Further components of the tool machine 1 comprise, for example, a rotation changer 13 for holding workpieces to be processed and for easily removing processed workpieces, a compact dust catcher 15 for sucking up smoke gases and suspended particles from the inner chamber, a scrap conveyor 17 and integrated elements not explicitly shown for the pneumatics, for the cutting and welding gas supply and for the central lubrication. Furthermore, a light grid 19 can delimit an external access region in relation to the rotation changer 13.

A work duration controlled by the machine control system allows the processing of the workpiece in a predetermined manner by the various components of the laser processing machine interacting.

Figure 2:
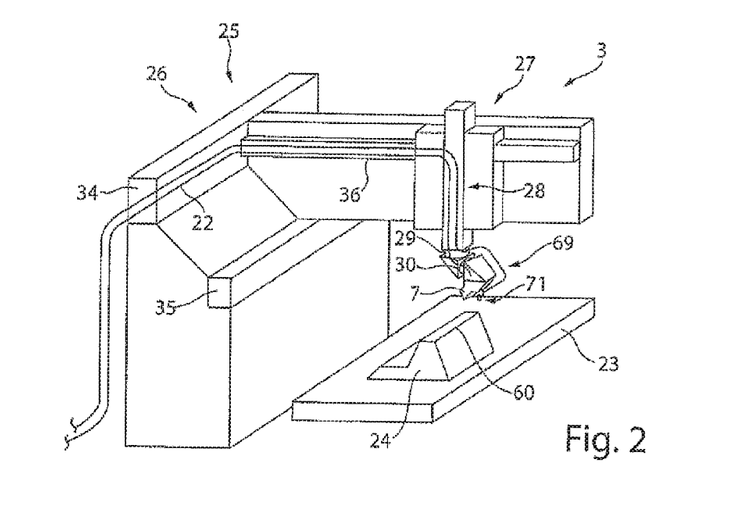
FIG. 2 a perspective view of a laser processing system.

FIG. 2 schematically shows the construction of the laser processing system 3 in the inner space of the protective cabin 11. The protective cabin 11 surrounds a movement unit 25 with functionally relevant components such as X, Y, and Z slots 26, 27, 28 and rotational joints 29, 30 for the movement of beam guide and media supply components relative to a workpiece 24. Bellows 34, 35, 36 correspondingly cover lines and mechanical components and run, for example, along the guides of the X and Y slots 26, 27.

The beam guide components comprise, for example, a laser light cable 22, a collimation optical system 51 and a processing optical system 66 for leading and focusing the laser beam 21 onto a workpiece 24. At least the processing optical system 66 is usually provided in a processing head 7, which can be substantially freely positioned and aligned, and emerges from the laser beam 21. Preferably, the collimation optical system 51 is also provided in the processing head 7. In particular, the processing head 7 can adopt any adjustable position and orientation in a region determined by the X, Y and Z slots 26, 27, 28 and the rotational joints 29, 30. Drive units are allocated to the X, Y and Z slots 26, 27, 28 and the rotational joints 29, 30, said drive units allowing a relative movement of the processing head 7 to be carried out in relation to the workpiece 24. From this, a working space emerges, which comprises all points that can be processed by the emerging, correspondingly focused laser beam 21.

Media supply components are, for example, a supply device 69 for an additional substance and/or protective or process gas, and one or more supply nozzles 71, which are fixed, for example, on the processing head 7.

In the embodiment according to FIG. 2, the workpiece 24 is mounted fixedly on the workpiece mounting device 23 because of a tensioning technique, such that, here, the processing can only take place from above. In alternative embodiments, the workpiece 24 can also be moved in the space or only the workpiece 24 can be moved. FIG. 2 schematically shows a workpiece mounting device 23 having a workpiece support surface for mounting the workpiece to be processed 24. Generally, further elements, such as spanners for tensioning the workpiece 24 and sensors for component recognition, belong to the workpiece mounting device 23. Further elements are, for example, an external button for the load confirmation or a status light which signals the component recognition to the user. The electrical and pneumatic interfaces for the connection of the elements can be, for example, in the switch cabinet, on the operating console 5 or on the rotational changer 13.

The laser processing system 3 is suitable for processing planar sheets, as well as three-dimensional, variably moulded workpieces, such as remoulded sheets, for example, in a cutting, welding or heating manner. Alternatively to the embodiment depicted, a machine having a 6-axis buckling arm robot, for example, would also be able to carry out these tasks.

FIG. 2 shows a three-dimensional component 24, on which a joining gap 60, for example, is weldingly joined together as an angle joint between two component edges.

Figures 3, 4:
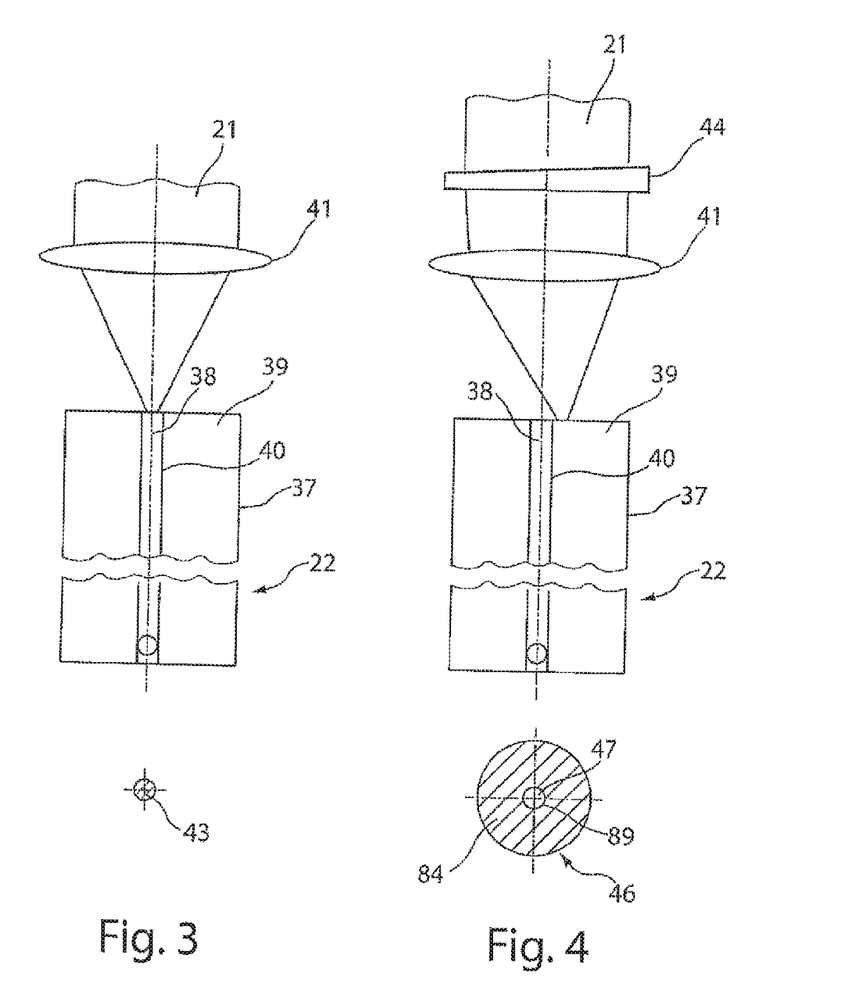

According to FIG. 3, for the beam guide 22, a 2-in-1 fibre 37, for example, can be used, into which the laser beam 21 is coupled out of the laser source 12. As a result, a change of the beam characteristics of the laser beam 21 is possible. With the 2-in-1 fibre 37, it is provided that an inner core 38 and an outer ring profile 39 are separated, for example, by an intermediary layer 40 with a lower refractive index. With a central coupling of the laser beam 21, as is depicted in FIG. 3, the laser beam 21 can be focused, for example, via a coupling lens 41, such that the laser beam 21 is coupled into the inner core 38. On the opposite end of the 2-in-1 fibre 37, the beam profile of the laser beam 31 has a point focus 43, which comprises a completely full circular profile. As a result, a high beam quality having a sharp focus can be obtained.

In FIG. 4, a schematic view of the laser beam 21 is depicted, in which the laser beam is coupled into an outer ring profile 39 of the 2-in-1 fibre 37. This can take place, for example, to that effect by a wedge plate 44 slightly deflecting the laser beam 21 out of an axis and focusing by means of the coupling lens 41, such that the laser beam 21 is coupled into the outer ring profile 39. A beam profile of the laser beam 21 having a ring focus 46 emerges from this, which comprises an annular beam surface 84. An inner region 47 that remains free is delimited by an inner beam surface edge 89 and is substantially determined by the diameter of the inner core 38 of the 2-in-1 fibre 37.

The use of a 2-in-1 fibre 37 is only exemplary. Alternatively, a 3-in-1 fibre, i.e. a fibre with an additional further ring profile, can also be provided. Similarly, alternatively to the step index fibre described, it is possible to use a gradient index fibre.

Figure 5:
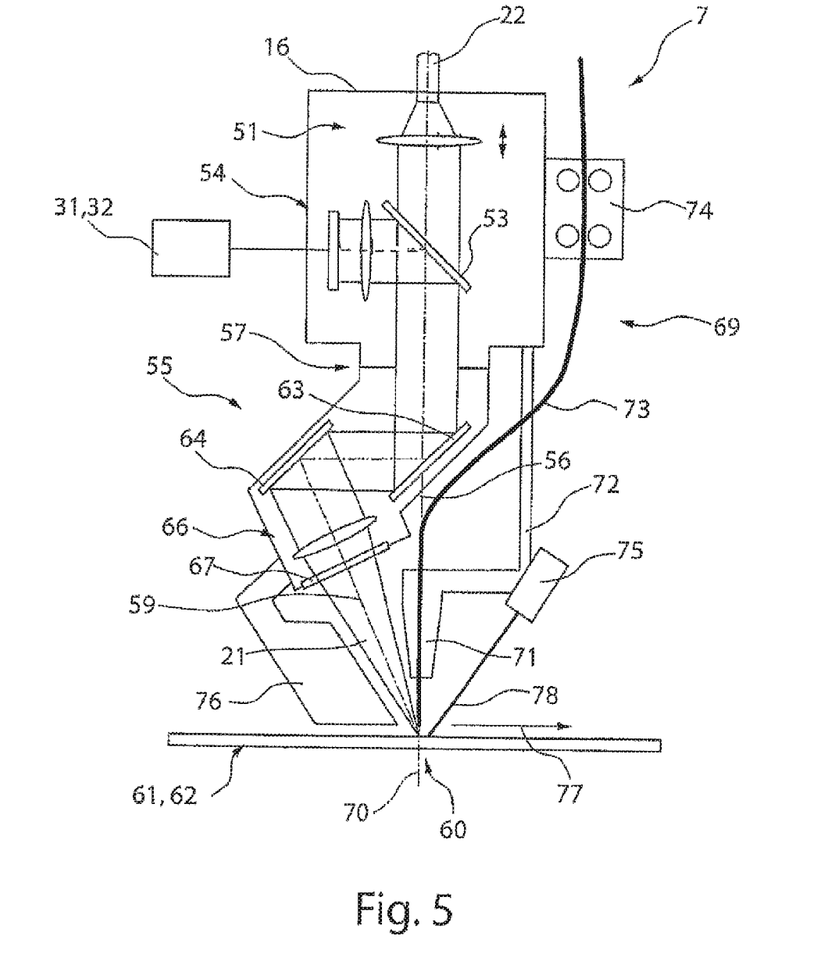

In FIG. 5, a schematic sectional view of a laser processing head 7 is depicted. The laser beam 21 is coupled into the housing 16 of the laser processing head 7 via the beam guide 22. The collimation optical system 51 can adjust the supplied beam profile of the laser beam 21 to the processing conditions. The collimation optical system 51 preferably lies on the main axis 56 of the laser processing head 7.

A movement device 55 is provided on the housing 16 of the laser processing head 7, which can preferably be rotatably arranged around the main axis 56. Preferably, a rotatable mount 57 is provided in order to rotatably receive this movement device 55 around the main axis 56. This movement device 55 comprises optical elements, by means of which the laser beam 21 is decoupled from the main axis 56 by the laser processing head 7 and transferred into a beam axis 59. This beam axis 59 is directed towards a joining gap 60, which is formed by two workpiece portions 61, 62 to be welded. This beam axis 59 is inclined in relation to the main axis at an angle of 5° to 45°. An angle between 7° and 15° is particularly preferred, since here a good coupling into the material is ensured and back-reflections into the laser optical system can be avoided.

The rotation mount 57 can preferably also be provided with a coupling in order to be able to receive differently formed movement devices 55. As a result, optical systems for other processing tasks, such as laser cutting or surface treatment, can also be rotatably fixed on the housing 16.

The movement device 55 comprises a first and at least one further deflection mirror 63, 64, and a processing optical system 66, which focuses the laser beam 21 and preferably also a protective glass 67, by means of which the processing optical system 66 is protected from contamination. A focus 83 of the laser beam 21 can be set by the processing optical system 66 and/or the collimation optical system 51, said focus 83 being able to be both above, at surface height, or below the joining gap 60 of the workpiece portions 61, 62, as is explained further below by means of FIGS. 6 and 8.

A supply device 69 can be arranged lying on the main axis 56 by the radially lateral decoupling of the laser beam 21 by the movement device 55. Preferably, this supply device 69 comprises a supply nozzle 71, which is preferably positioned on the main axis 56 via a holder 72 fixedly arranged on the housing 16. An additional substance 73 can be supplied for the welding process. In the exemplary embodiment according to FIG. 5, the additional substance 73 is formed as an additional wire, which is guided centrally through a supply nozzle 71. Furthermore, a conveying device 74 is provided on the housing 16 of the laser processing head 7, said conveying device 74 being formed as a wire conveyor in the present exemplary case. This conveying device 74 is connected to the machine control device 31 and/or laser control device 32 and is controlled via these.

The additional substance 73 is preferably supplied by the positioning of the supply nozzle 71 on the main axis 56 perpendicular to the surface of the workpiece portions 61, 62 or perpendicular to the joining gap 60.

Another line laser 75 or further optical systems can additionally be provided on the holder 72. The alignment of these optical systems is in such a way that these are directed towards the welding point. The welding point is defined by the laser beam 21 hitting the joining gap 60.

Furthermore, an optical sensor system 54 can be provided in or on the laser processing head 7 in order to detect the welding point or the joining gap 60 and/or the line laser 78 projected onto the workpiece. An uncoupled beam can be supplied to the sensor system 54, such as a camera, in particular a CCD camera, for example, via a decoupling element 53, for detecting the joining gap 60, which forwards the signals obtained from this to the control device 31, 32.

Furthermore, a nozzle, in particular a linear nozzle 76, can be provided on the movement device 55, through which linear nozzle 76 protective gas flows out in the direction of the components 61, 62 onto the welded seam. In doing so, the fresh welded seam upper beam is shielded from oxygen from the atmosphere in the cooling phase. In addition, a part of the protective gas preferably flows in the direction of the shifting movement 77 of the laser processing head 7 during the laser welding in order to also already shield the process point from the atmosphere. The protective gas supply could alternatively also be attached to the holder 72 in order to enable a better accessibility; to do so, nozzle forms other than a linear nozzle are also possible.

Figure 6:
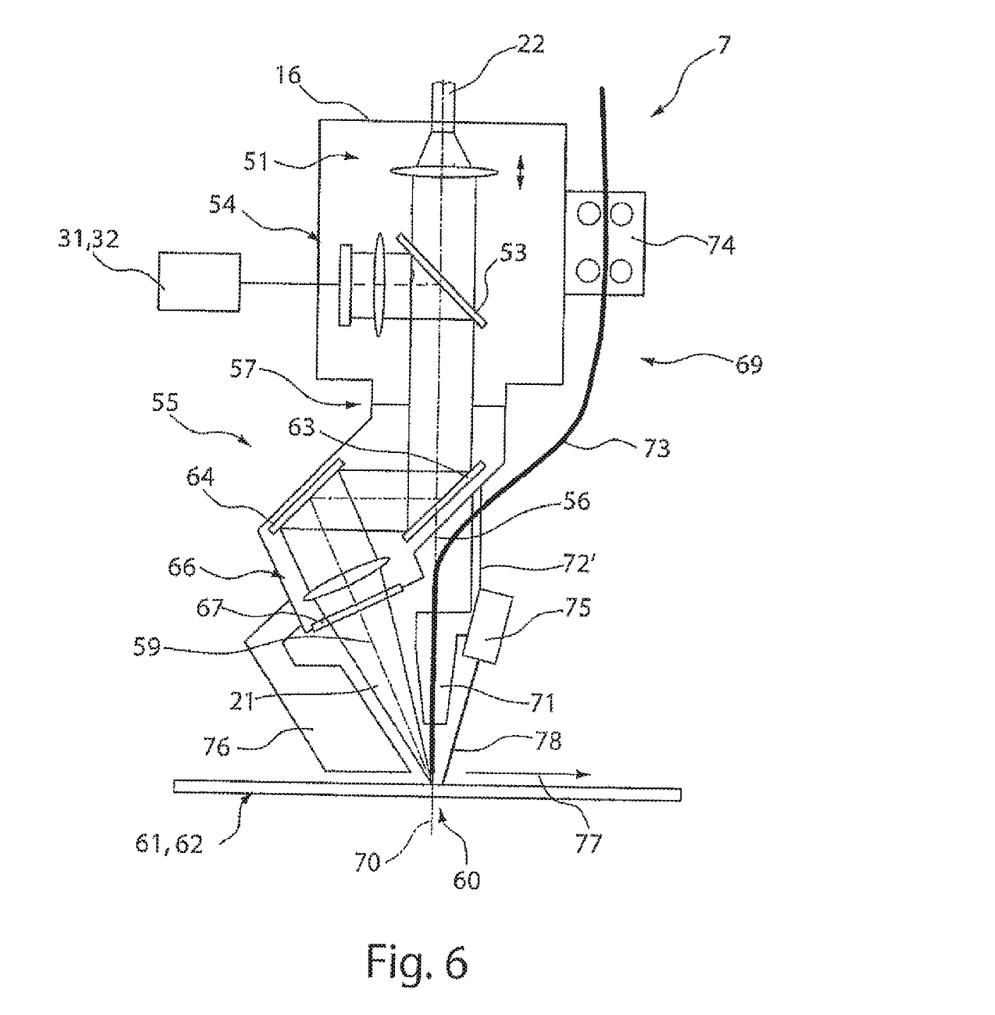

In FIG. 6, a schematic sectional view of an alternative embodiment of the laser processing head 7 according to FIG. 5 is depicted. This embodiment according to FIG. 6 differs from the embodiment according to FIG. 5 in that the holder 72' is arranged on the movement device 55 and not on the housing 16. Apart from that, this embodiment corresponds to the laser processing head 7 according to FIG. 5, such that reference is made to this completely. This embodiment of the laser processing head 7 depicted in FIG. 6 has the advantage that the movement device 55 can be rotated around the supply axis 70, in particular the main axis 56, by a full 360°. A full rotation of the movement device 55 around the supply axis 70, in particular the main axis 56, is possible. Furthermore, this embodiment has the advantage that the line generated by the line laser 75 and aligned perpendicularly to the joining gap 60 remains in this alignment during a rotational movement as a result by rotating the line laser 75 as well. This simplifies an evaluation of the representative situation on the joining gap 60 as a result of the sensors, whereby the process safety can be increased.

Figure 7:
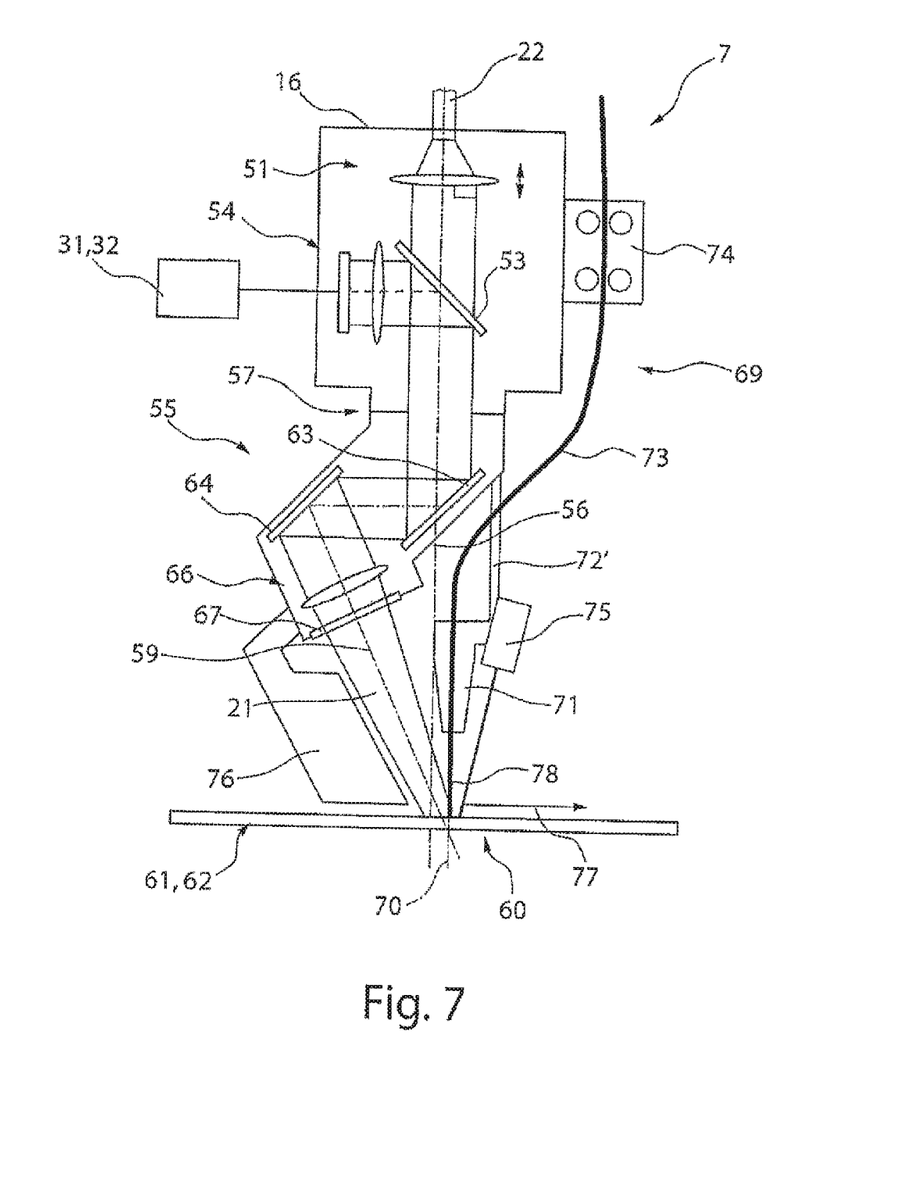

In FIG. 7, a schematic side view of an alternative embodiment of the laser processing head 7 to FIG. 6 is depicted. This embodiment deviates from the embodiment depicted in FIG. 6 in that the supply axis 70 of the supply device 69 is aligned in parallel to the main axis 56 of the housing 16 or to the collimation optical system 51. The holder 72' is arranged eccentrically on the movement device 55. Alternatively, the holder 72' arranged on the movement device 55 positions the supply nozzle 71 with the supply axis 70 in parallel offset to the main axis 56 of the collimation optical system. Apart from that, the corresponding statements with respect to FIG. 6 or FIG. 5 apply.

The laser welding of the two workpiece portions 61, 62 is controlled by the machine control device 31 and/or the laser control device 32. Preferably, the workpiece portions 61, 62 are positioned in relation to one another in such a way that the width of the joining gap 60 is virtually equal to zero. However, this cannot often be successfully implemented because of processing tolerances or further requirements. Therefore, the joining gap 60 is of a different width. An adjustment to the changing situations can be carried out immediately by the arrangement of the laser processing head 7, the detection of the joining gap 60 before the formation of the welded seam 81 and the change of the beam characteristic of the laser beam from a ring focus 43 into a point focus 46 and vice versa with the welding method described below by means of FIGS. 8 to 11, and a high quality of the welding connection can be obtained.

Before the joining gap 60 formed by the workpiece portions 61, 62 to be welded is welded, the course and/or the width of the joining gap can be detected by a teach-in method. To do so, the line laser 25 can be used, which is arranged in advance on the laser processing head 7 and is detected by a sensor system which is attached to the processing system in or on the laser processing head 7 in the machine. In FIG. 5, this sensor system is formed by the sensor system 54. Alternatively, the sensor system 54 can also be formed alone. The sensor system is advantageously arranged in the laser processing head 7, such that the required process data for the joining gap 60 can also be detected by the processing optical system 66. The method below for the laser welding applies both for a preceding teach-in mode and an optical detection of the joining gap 60 with an immediately subsequent formation of a welded seam 81 in the joining gap 60.

When detecting a first gap size of a joining gap 60, which, for example, is smaller than the material thickness of the workpiece portions 61, 62 to be welded, the coupling of the laser beam 21 into the beam guide 22 is controlled in such a way that the laser beam has a beam profile having a point focus 43. At the same time, the supply device 69 for the additional substance 73 is shut down. Then, the laser processing head 7 is shifted along the course of the joining gap 60, and the welded seam 81 is formed in order to close the joining gap 60. If there is no teach-in mode before the welding process, at least the gap width of the joining gap 60 is monitored and requested by the sensor system 54 during the laser welding.

If the gap width of the joining gap 60 changes such that a gap width is detected which is greater than then first gap size, the welding parameters are changed by means of the machine control device 31 and/or laser control device 32. The supply device 69 is controlled in order to also guide the additional substance. Furthermore, the beam characteristic of the laser beam 21 is changed from a point focus 43 into a ring focus 46. Further parameters, such as laser intensity, for example, can also be adjusted.

Figure 8:
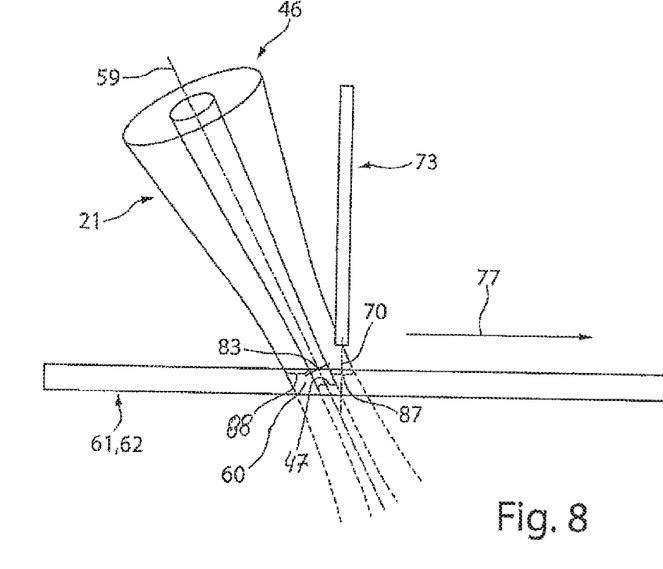
Figure 9:
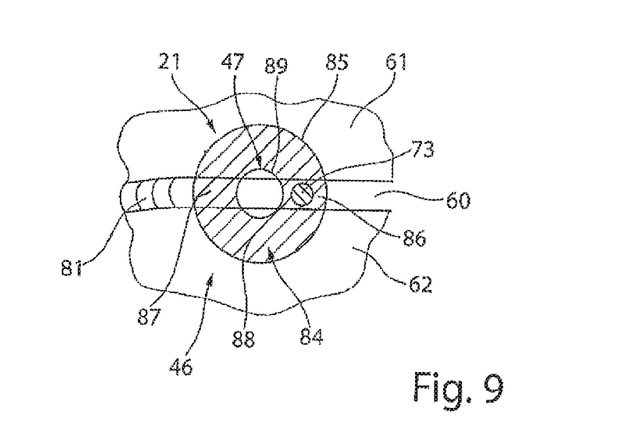

With a welding of the workpiece portions 62, 63 with an annular beam profile of the laser beam 21, the additional substance 73 is arranged in advance of the laser beam 21. The ring focus 46 is preferably set in such a way that the focal point 83, for example, lies on the workpiece plane of the workpiece portions 61, 62 (FIG. 8). As a result, an annular beam surface 84 is formed, which, for example, has an inner, beam-free region 47, which substantially corresponds to the width of the joining gap 60, as is depicted in FIG. 9. An outer beam surface edge 85 extends into the edge region of the workpiece portions 61, 62, which run along the joining gap 60. As a result, a beam surface portion 86 emerges in advance, which covers the joining portion 60. Furthermore, a beam surface portion 87, which is behind in comparison to the beam surface portion 86, emerges, A covering beam surface 88, which acts on the joining geometry or on the edge contour of the workpiece portion 61, 62, is to the left and right of the joining gap 60.

Supplying the supply substance 73 takes place in such a way that the advance beam surface portion 86 crosses the additional substance 73 or the additional substance 73 is supplied to the joining gap 60 in such a way that it is inside the beam surface portion 86. As a result, a melting of the additional substance 73 as well as of an edge contour and the workpiece portions 61, 62, and the formation of a welded seam 81 is obtained in this region. As a result of the beam surface portion 87 behind, the melting bath formed in advance of the surface portion is warmed by the beam surface portion 87 behind. As a result, the cooling speed can be reduced, whereby an improvement of the quality of the welded seam 81 is achieved.

Figure 10:
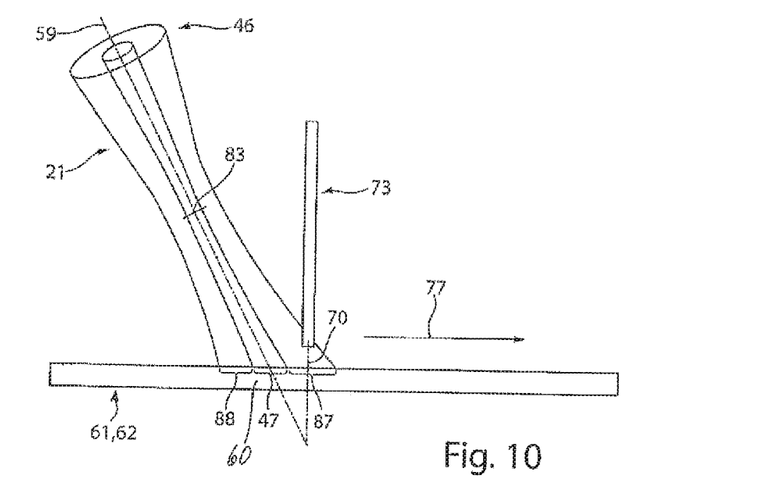

The schematic depiction of the laser beam 21 aimed at the joining gap 60 and of the additional substance 73 in FIG. 10 deviates from the described embodiment in FIGS. 8 and 9 to the effect that the focus 83 of the ring focus 46 is above the workpiece portions 61, 62. As a result, analogous ratios to those in the embodiments according to FIGS. 8 and 9 emerge. A deviation lies in that a beam surface portion 86 in advance and longer in relation to the joining gap 60 than with a position of the focus 83 on the workpiece plane of the workpiece portions 61, 62 can be obtained with a focus 83 above the workpiece plane with the same alignment of the beam axis 59 and the main axis 56. In particular with low feed speeds, this can be advantageous in order to supply the additional substance 73 with less laser power and thus to adjust the melting speed to the also lower supply speed.

Figure 11:
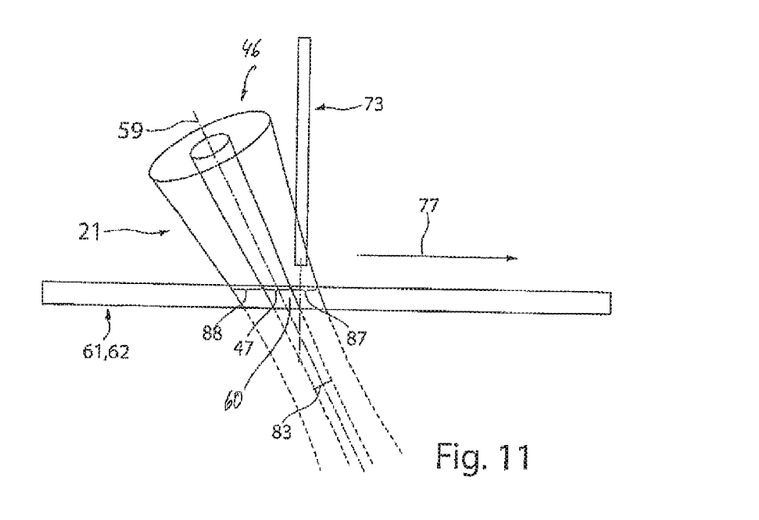

In FIG. 11, the ring focus 46 is set in such a way that the focus 83 lies below the workpiece plane of the workpiece portions 61, 62. The difference in terms of the ratios in FIGS. 8 and 9 lies in that a beam surface portion 87 that is behind and longer in relation to the joining gap 60 than with a position of the focus 83 on the workpiece plane of the workpiece portions 61, 62, can be obtained with a focus 83 below the workpiece plane with the same alignment of the beam axis 59 and the main axis 56. With the same feed speed, the melting bath is thus warmed up for a somewhat longer period. In addition, it can be seen in FIG. 11 that the additional substance 73 should reserve a greater distance through the laser beam 21 up to the workpiece plane of the workpiece portions 61, 62 caused by the laser beam characteristic with a focus position below the workpiece plane of the workpiece portions 61, 62, whereby a higher supply speed can also be obtained, with which the additional substance 73 is still completely melted. The focus position lying below the workpiece plane of the workpiece portions 61, 62 is thus particularly suitable for high feed speeds or when a large amount of additional substance is required, such as, for example, with thick components or a comparatively large gap.

Figure 12:
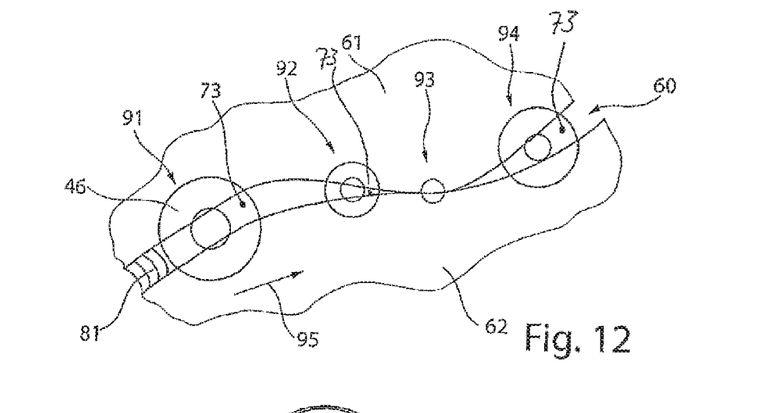

In FIG. 12, a course of a joining gap 60, for example, having a different width between the workpiece portions 61, 62 is depicted, At the same time, this joining gap 60 does not run in a straight line, instead it follows a contour line.

To further discuss the method, four welding positions 91 to 94, for example, are depicted, which are described below. In the welding position 91, there is a fall formation, as is described in FIGS. 8 and 9. The joining gap 60 has a width which is greater than the first gap size, such that the method parameters are controlled according to the second gap size. With a shifting movement of the laser processing head 7 in the welding direction according to arrow 95, the width of the joining gap 60 is reduced. In the welding position 92, it was detected by the optical system 54, 75 that the width of the joining gap 60 lies in the range of the first gap size. Therefore, the supply of the additional substance 73 is set and a change of the ring focus 46 to the point focus 43 is carried out.

With a shifting movement from the welding point 91 to the welding point 92, the ring focus 46 can be simply adjusted to the course of the joining gap 60 by a rotational movement of the movement device 55 as a result of the movement device 55 provided rotatingly in relation to the housing 16. To control the laser processing head 7, it applies that the main axis 56 runs in the joining gap 60.

From the welding point 92 to the welding point 93, the width of the joining gap 60 has a first gap size, for example. As a result, the joining gap 60 widens out in turn, such that, in turn, conditions are set based on the welding point 93 up to welding point 94, like between the welding point 91 and 92, in order to connect the widening joining gap 60 to a welded seam.

Figure 13:
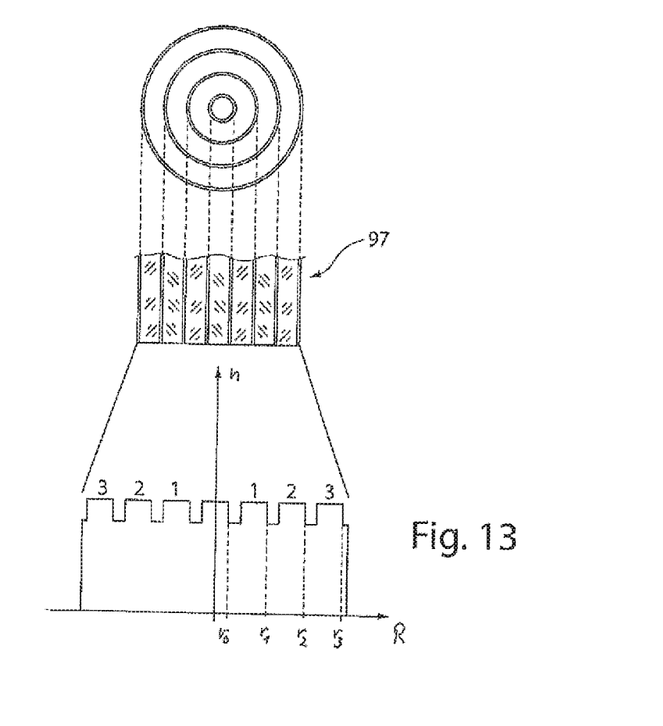

In FIG. 13, an N-in-1 fibre (or also multi-coax fibre) 97 is depicted in top view and in a schematic cut-out (in the present case, a 4-in-1 fibre). As a result of such an N-in-1 fibre 97, the beam characteristic of the laser beam 21 can be set with regards to several diameters of the ring focus 46. Depending on the selection of the ring n=1, 2, 3 . . . , in which the laser beam 21 is coupled, different diameters of the annular beam surface can be obtained for the ring focus 46.

The invention claimed is:

1. A method of laser welding a first and a second workpiece portion with a laser beam guided along a joining gap formed between the workpiece portions by a laser processing head, comprising:
   focusing the laser beam with a processing optical system;
   supplying an additional substance aligned in relation to the joining gap;
   detecting at least one gap width of the joining gap of the workpiece portions to be welded;
   evaluating the detected at least one gap width along the course of the joining gap and comparing the detected at least one gap width with at least one first gap size and at least one second gap size, wherein the at least one first gap size comprises a gap width in which a welded seam is formed without the additional substance, and the at least one second gap size comprises a gap width with which the additional substance is supplied to form the welded seam for filling the joining gap;

in response to determining that the detected at least one gap width is within the at least one first gap size,
  i) setting the beam profile of the laser beam with a point focus, and
  ii) shutting down the supply of the additional substance to the joining gap during the laser welding; and in response to determining that the detected at least one gap width is not within the at least one first gap size but is within the at least one second gap size,
  i) setting the beam profile of the laser beam with a ring focus, and
  ii) supplying the additional substance to the joining gap while melting the additional substance with the beam profile set to the ring focus.

2. The method of claim 1, wherein detecting the joining gap comprises detecting the joining gap by a sensor system during a teach-in mode for detecting the course of the joining gap or immediately before introducing the welded seam coaxially relative to the laser beam or in advance.

3. The method of claim 1, wherein the first gap size is selected based at least on a material thickness of the workpiece portions to be welded, and the first gap size is smaller than the material thickness of the workpiece portions to be welded, and wherein the first gap size is equal to or less than a share of 15% of the material thickness of the workpiece portions to be welded.

4. The method of claim 3, wherein the first gap size is equal to or less than a share of 10% of the material thickness of the workpiece portions to be welded.

5. The method if claim 1, wherein the additional substance is supplied to the joining gap in advance in the welding direction in relation to the beam axis of the laser beam.

6. The method of claim 1, wherein the additional substance comprises one of an additional wire supplied via a wire supply device or a powder supplied via at least one nozzle, to the laser beam.

7. The method of claim 1, wherein supplying the additional substance comprises supplying the additional substance in a beam surface portion of the annular beam surface of the laser beam that is formed by a region of the annular beam surface that is in a front side of the annular beam in a direction along which the laser beam moves during laser welding, the additional substance covering the joining gap.

8. The method of claim 1, further comprising heating, in a beam surface portion of the annular beam surface, a molten mass formed in an advance beam surface portion, said beam surface portion being behind and covering the joining gap.

9. The method of claim 1, further comprising setting the width of a beam surface portion of the annular beam surface of the laser beam above or below a plane of the workpiece portions to be connected by a distance apart of the focal point, said beam surface portion covering the joining gap.

10. The method of claim 1, wherein the beam profile of the laser beam is formed with the ring focus by at least one of a 2-in-1 fiber, a 3-in-1 fiber, an axicon, or an N-in-1 fiber.

11. The method of claim 1, wherein supplying the additional substance comprises supplying the additional substance to the joining gap by a supply device, the supply device aligned on a supply axis in relation to the joining gap, the method further comprising:
  coupling the laser beam into a movement device arranged on the housing and transferred into a beam axis of the movement device; and
  rotatingly driving the beam axis of the movement device corresponding to the course of the joining gap in the welding direction around the supply axis of the additional substance; and
  crossing the beam axis across the additional substance in the joining gap during the rotational movement of the movement device.

12. The method of claim 1, wherein setting the beam profile of the laser beam with the ring focus comprises forming an annular beam surface by the beam profile of the laser beam, said beam surface covering the joining gap and delimiting the inner beam-free region by an inner beam surface edge, said inner beam-free region corresponding to the at least one gap width of the joining gap or wider, and an outer beam surface edge of the annular beam surface covering two edges of the workpiece portions that define the gap.

* * * * *